May 3, 1966  R. E. KELLER  3,249,067
CONVERTIBLE RAILWAY-HIGHWAY VEHICLE
Filed Oct. 17, 1962  3 Sheets-Sheet 1
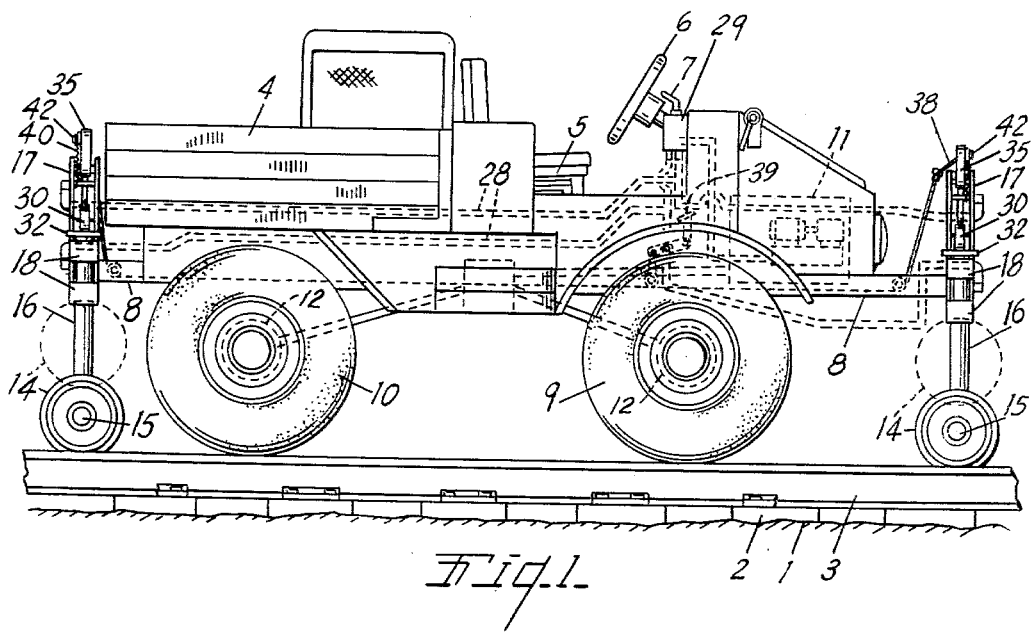
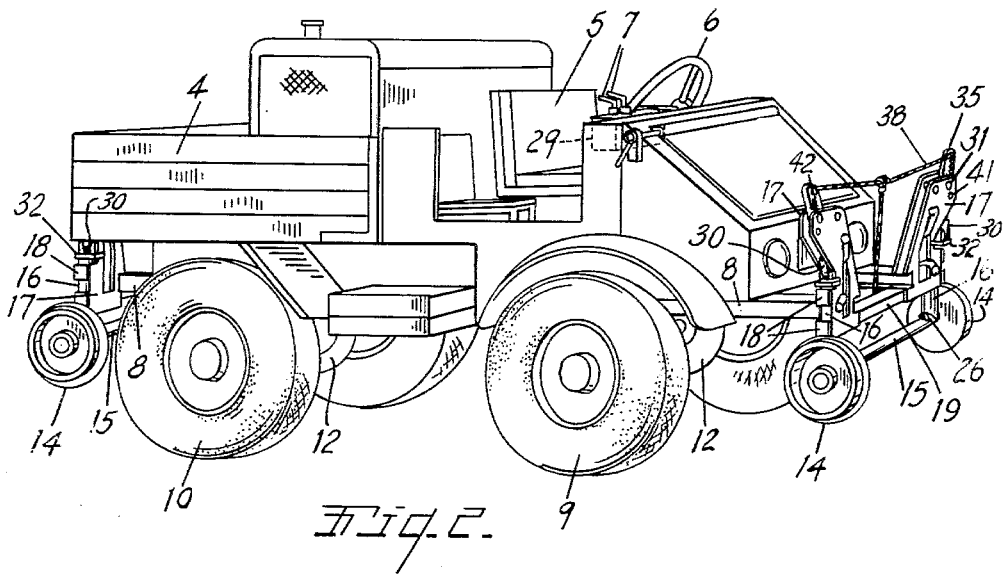
INVENTOR.
Ralph E. Keller
BY
ATTORNEY.

May 3, 1966 R. E. KELLER 3,249,067
CONVERTIBLE RAILWAY-HIGHWAY VEHICLE
Filed Oct. 17, 1962 3 Sheets-Sheet 2
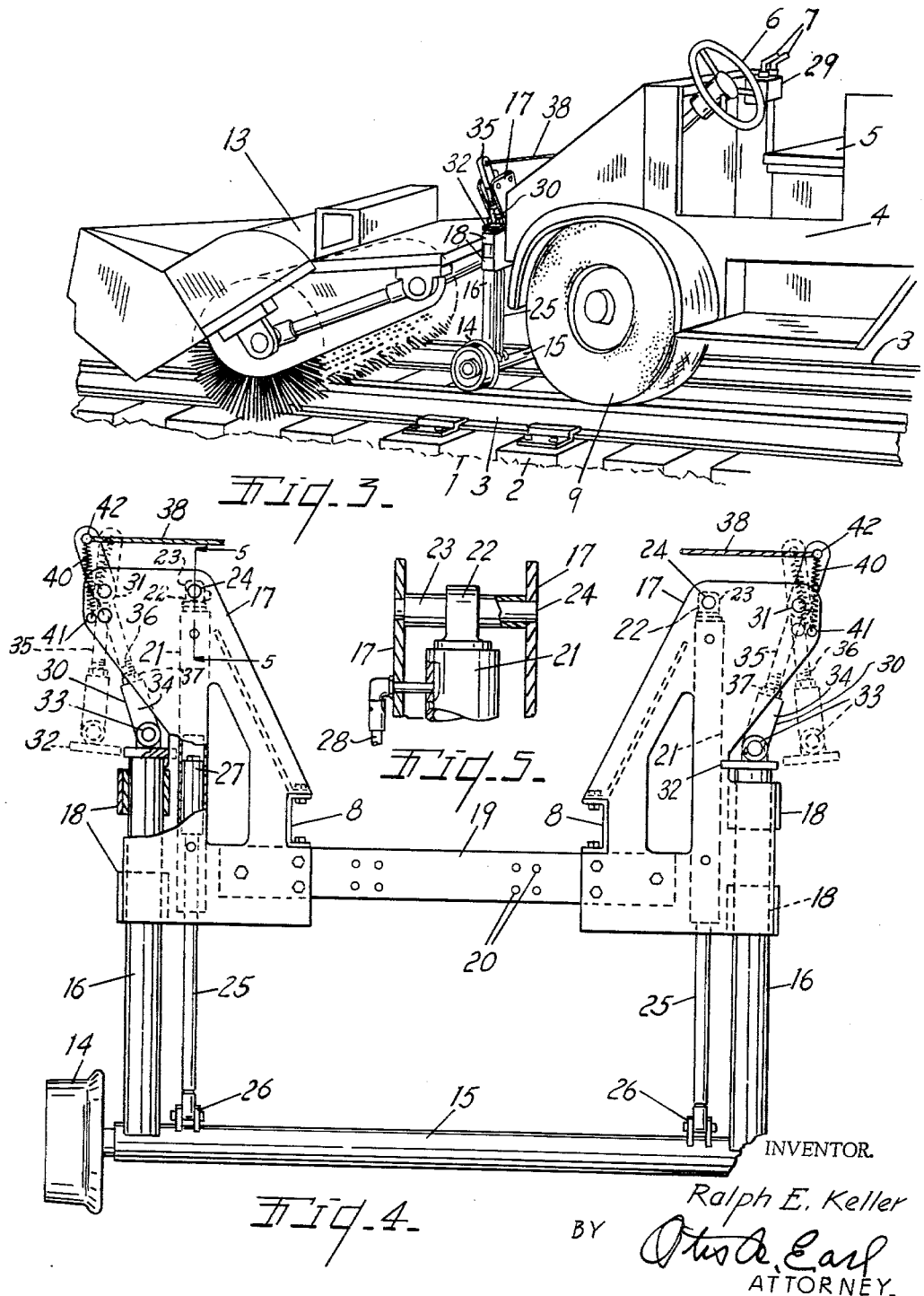
INVENTOR.
Ralph E. Keller
BY
ATTORNEY May 3, 1966 R. E. KELLER 3,249,067
CONVERTIBLE RAILWAY-HIGHWAY VEHICLE
Filed Oct. 17, 1962 3 Sheets-Sheet 3
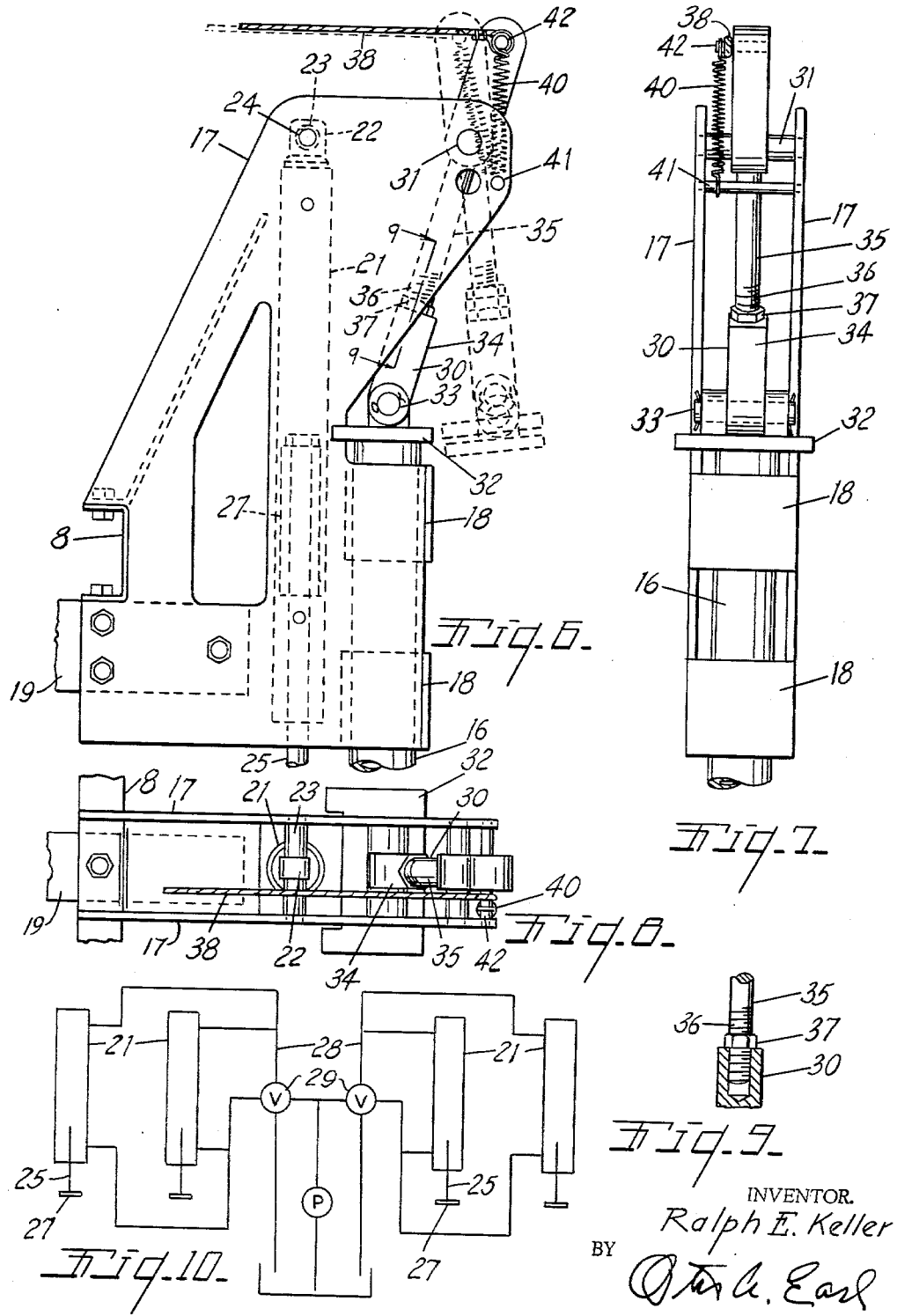
INVENTOR.
Ralph E. Keller
BY
ATTORNEY.

United States Patent Office 3,249,067
Patented May 3, 1966

3,249,067
CONVERTIBLE RAILWAY-HIGHWAY VEHICLE
Ralph E. Keller, Kalamazoo, Mich., assignor to Kalamazoo Manufacturing Company, Kalamazoo, Mich.
Filed Oct. 17, 1962, Ser. No. 231,114
9 Claims. (Cl. 105—215)

This invention relates to automotive vehicles adapted to travel on the rails of railway tracks and to and from the same, and on other surfaces.

The main objects of this invention are,

First, to provide an automotive vehicle provided with rubber tired vehicle wheels adapted to travel on the rails of a railway track and on other surfaces and provided with means for effectively maintaining the vehicle on the rails and adjustable to and from rail engaging position.

Second, to provide a vehicle having these advantages which may be speedily operated and at the same time is maintained on the rails around curves and across switches and the like.

Objects relating to details and economies of the invention will appear from the description to follow. The invention is defined and pointed out in the claims. A preferred embodiment of the invention is illustrated in the accompanying drawing, in which:

FIG. 1 is a side elevational view of a vehicle embodying the applicant's invention positioned on a railway track, parts of the vehicle body being shown conventionally, the rail engaging wheels being illustrated in rail engaged position by full lines and in retracted position by dotted lines.

FIG. 2 is a perspective view of the embodiment of my invention shown in FIG. 1 with the rail engaging wheels in raised position.

FIG. 3 is a fragmentary perspective view of the front portion of the vehicle with a track brush operatively associated therewith, the brush being shown mainly in conventional form.

FIG. 4 is a fragmentary elevational view of one of the rail engaging wheel units, the upward thrust sustaining units being shown in operative position by full lines and in retracted position by dashed lines.

FIG. 5 is an enlarged fragmentary view, partially in section, on a line corresponding to line 5—5 of FIG. 4 illustrating certain of the structural details.

FIG. 6 is an enlarged fragmentary view of parts shown in FIG. 4 and illustrating the adjustment of the upward thrust sustaining members for the track engaging wheel units.

FIG. 7 is a fragmentary end elevational view of one of the track engaging wheel supporting units.

FIG. 8 is a fragmentary plan view of the parts shown in FIGS. 6 and 7.

FIG. 9 is a fragmentary sectional view on a line corresponding to line 9—9 of FIG. 6.

FIG. 10 is a diagrammatic view of the two rail engaging wheel units and their control relationship.

In the accompanying drawing, 1 represents ballast, 2 ties, and 3 the rails of a railway track. The vehicle body, designated generally by the numeral 4, is mainly shown in conventional form, as the details thereof form no part of my present invention, except that the body is adapted to have a seat 5 mounted thereon to be operatively positioned relative to the steering wheel 6 and to the control members 7, conventionally illustrated in FIGS. 1 and 2. The body of the vehicle is mounted on or includes the longitudinally extending laterally spaced frame support members 8, the ends of which project both forwardly and rearwardly of the body portion of the vehicle, see FIGS. 1, 2 and 4. In the embodiment illustrated, these are formed of channel members, as best shown in FIG. 4. Both the front and the rear rubber tired wheels 9 and 10 have driving connections to the motor disposed within the housing 11, portions of the powered axle 12 for the front and rear pairs of driving wheels being shown in FIG. 2. The driving connections from the motor to the axle are not illustrated, as the structural details thereof form no part of this invention and such details may be varied. However, it is desired to emphasize that in the preferred embodiments of my invention both the front and the rear wheels are driven, and that the wheels are gauged to travel on the rails of the railway track.

In the accompanying drawing, I illustrate a track sweeper, designated generally by the numeral 13, which is operatively connected to the front end of the vehicle and in practice means are provided for raising and lowering it. However, it should be borne in mind that my invention is desirable for manipulating other forms of implements especially those designed or adapted for work on railway tracks, for example ballast distributors, tampers and the like.

The front and rear rail wheel supporting units are desirably duplicates and adjustably support the pairs of rail engaging wheels 14 for vertical adjustment. These wheels 14 are rotatably mounted in the tubular axle support members 15 which are provided with laterally spaced upwardly projecting uprights 16, the brackets, generally designated by the numeral 17, being provided with slideways 18 for these uprights 16. The brackets are fixedly mounted on the ends of the body members 8, see FIG. 4. They are braced and fixedly connected by the cross members 19, which, in the embodiment illustrated, are provided with bolt receiving holes 20 for attachment of the machine to be propelled, for example, the brush 13. The connecting bolts are not illustrated, as it will be readily understood.

In the embodiment illustrated, the rail engaging units are raised and lowered by manually controlled hydraulic means which comprise the cylinders 21 which are provided with coupling members 22 at their upper ends provided with tubular cross portions 23 through which the supporting or anchoring members 24 are disposed, see details in FIG. 5.

The plunger rods 25 are connected to the lugs 26 on the members 15, and they are provided with plungers 27 illustrated by dashed lines in FIG. 6. The conduits 28 are connected to a suitable hydraulic source not illustrated, the conduits 28 being shown by dotted lines in FIG. 1 and control valves being conventionally illustrated at 29.

It should be understood that the hydraulic source is such as to provide power not only for the raising and lowering of the rail engaging wheels 14 to and from track engaging position, but also such as to lift part of the weight of the vehicle. For example, a desirable use load on these flanged track engaging wheels is in the range of 25% of the weight of the vehicle body. However, the applicant does not rely on the hydraulic means for sustaining the load but provides axle thrust sustaining members, designated generally by the numeral 30, which are pivotally mounted at 31 on the brackets 17 in laterally outwardly spaced relation to the axes of the posts 16 and provided with post engaging members 32 which are pivotally mounted at 33 on their lower ends. These thrust engaging members, designated generally by the numeral 30 in the embodiment illustrated, are longitudinally adjustable and comprise the members 34 to which the post engaging members 32 are pivotally connected and the upper section 35, the two sections having threaded connection at 36 including a clamping nut 37 for securing the sections in their adjusted position.

The upper ends of the members 30 project above their pivots 31 and are provided with disengaging cables 38, the pairs of post engaging members being operatively connected by the cable 38 which is connected to a pedal 39 or other operating member positioned to be operated by the operator of the vehicle. The thrust sustaining members are automatically actuated to thrust engaging position by the springs 40 which are connected to the bracket members at 41 and to the upwardly projecting portions of the thrust sustaining portions at 42, see FIGS. 6, 7 and 8. The adjustable feature of the thrust sustaining members is indicated by dotted lines in FIG. 6. In their laterally inwardly rotated, post supporting position, the post engaging members 32 are abutted laterally against the brackets 17 in a toggle or self locking relation to the pivots 31.

With the rail engaging wheels 14 at the front and rear of the vehicle, it is supportedly and guidedly maintained on the track not only on relatively straight tracks, but where the tracks are substantially curved and at switches and the like. However, as stated, the machine is not only designed for use on railway tracks but may be used on surfaces for example a machine equipped with a sweeper as shown in FIG. 3, or a scraper for use in removing snow from railway yards, station pavements and the like. When used on railway tracks, it is commonly desirable to quickly remove the machine from and replace it on the track, and the surfaces alongside the tracks may be sharply inclined. The applicant's apparatus is capable of driving on such surfaces and in the placement of the machine on and off the tracks at least some wheel is likely to be out of engagement with any surface, so it is desirable that all four of the resiliently tired wheels be power driven.

I have illustrated and described my invention in a highly practical commercial embodiment thereof. As stated, certain structural features of the vehicle as such are conventionally illustrated as they form no part of my present invention and may be substantially varied without departing from my invention. It is believed, however, that the disclosure made will enable those skilled in the art to embody and adapt my invention as may be desired.

Having thus described the invention, what is claimed as new and desired to secure by Letters Patent is:

1. In a combined road-rail vehicle having a vehicle frame with roadway engaging wheels springably connected thereto, and flanged rail engaging wheels vertically adjustably mounted thereon, means for mounting each of said flanged wheels comprising, a sub-frame member secured to said vehicle frame and having an upright slideway formed therein, a post slidably guided and laterally supported in two angularly displaced planes by said slideway, an axle for said flanged wheel rigidly secured to the lower portion of said post and projecting laterally therefrom, a fluid pressure operated cylinder having an extensible piston rod and having said cylinder and said piston rod connected in extensible relation between said sub-frame member and said axle in generally parallel relation to said slide and slideway, said slide constituting the sole lateral support for said post, a thrust support member pivotally mounted on aid sub-frame member and having a swinging end swingable into and out of downwardly opposed thrust transmitting relation to said post in downwardly extended position of said post to support said flanged wheels in load supporting relation to said vehicle, means connected to each axle to maintain opposite pairs of said flanged wheels in parallel planes, selectively operable means connected to swing said thrust support members out of opposed relation to said posts, and spring means biasing said thrust support members to opposed thrust transmitting relation to said posts.

2. A road-rail vehicle as defined in claim 1 in which said thrust support members are adjustable longitudinally of said slideways to support said posts and the wheels carried thereby at different distances below said sub-frame members.

3. In the combination of a powered manually controllable vehicle including a frame, a body member mounted on said frame, and resiliently tired wheels gauged to travel on the rails of a railway track, pairs of flanged rail engaging wheels gauged to travel on the rails of a railway track, axle support members for said flanged rail engaging wheels, means for vertically adjusting and supporting said axle support members comprising, upwardly projecting posts rigidly connected to said support members formed in brackets, slideways for said posts mounted on said vehicle frame, manually controlled means for raising and lowering said axle support members, vertical thrust sustaining members for said axle support member posts pivotally mounted on said frame, said thrust sustaining members having post engaging members mounted on their swinging ends, said thrust sustaining members being vertically adjustable between their pivotal connection to said frame and their said post engaging members, and means for disengaging said thrust sustaining members from said posts, said posts and said slideways constituting the sole lateral support for said flanged wheels.

4. In the combination of a powered manually controllable vehicle including a frame, a body member mounted on said frame, and resiliently tired wheels gauged to travel on the rails of a railway track, pairs of flanged rail engaging wheels gauged to travel on the rails of a railway track, axle support members for said flanged rail engaging wheels, means for vertically adjusting and supporting said axle support members comprising, upwardly projecting posts rigidly connected to said support members formed in brackets, slideways in fully laterally supporting engagement with said posts mounted on said vehicle frame, manually controlled means for raising and lowering said axle support members, vertical thrust sustaining members for said axle support member posts pivotally mounted on said frame, said thrust sustaining members having post engaging members pivotally mounted on their lower ends, springs connected between said thrust sustaining members and to said frame and acting to urge said thrust sustaining members to post engaging position, and means for disengaging said thrust sustaining members from said posts, said posts and said slideways constituting the sole lateral support for said flanged wheels.

5. In the combination of a powered manually controllable vehicle including a frame, a body member mounted on said frame, and resiliently tired wheels gauged to travel on the rails of a railway track, pairs of flanged rail engaging wheels gauged to travel on the rails of a railway track, axle support members for said flanged rail engaging wheels, means for vertically adjusting and supporting said axle support members comprising, upwardly projecting posts rigidly connected to said support members formed in brackets, slideways in fully laterally supporting engagement with said posts mounted on said vehicle frame, manually controlled means for raising and lowering said axle support members, vertical thrust sustaining members for said axle support member posts pivotally mounted on said frame, said thrust sustaining members having post engaging members pivotally mounted on their lower ends, said thrust sustaining members being longitudinally adjustable between their pivotal connection to said frame and their said post engaging members, springs connected between said thrust sustaining members and to said frame and acting to urge said thrust sustaining members to post engaging position, and means for disengaging said thrust sustaining members from said posts, said posts and said slideways constituting the sole lateral support for said flanged wheels.

6. In a machine of the class described, the combination of a powered manually controllable vehicle including a frame, a body member mounted on said frame, and resiliently tired wheels gauged to travel on the rails of a railway track, front and rear pairs of flanged rail engaging wheels disposed forwardly and rearwardly relative to said tired wheels and gauged to travel on the rails of a railway track, axle support members for said flanged rail engaging wheels provided with laterally spaced upwardly projecting posts, means locating the axle support members of each pair of flanged wheels with the axles thereon in parallel relation, brackets having slideways in fully laterally supporting engagement with said posts mounted on said vehicle frame at the front and rear of the vehicle body member, manually controlled hydraulically actuated means for raising and lowering said axle support members and comprising cylinders and coacting plungers provided with plunger rods operatively connected between said axle support members and said brackets, vertical thrust sustaining members for said axle support member posts mounted on said brackets for adjustment to and from positions overlying the upper ends of said posts, means acting to urge said thrust sustaining members to post engaging position, and remotely controlled manually operable means for disengaging said thrust sustaining members from said posts, said posts and said slideways constituting the sole lateral support for said flanged wheels.

7. In a machine of the class described, the combination of a powered manually controllable vehicle including a frame, a body member mounted on said frame, and resiliently tired wheels gauged to travel on the rails of a railway track, front and rear pairs of flanged rail engaging wheels disposed forwardly and rearwardly relative to said tired wheels and gauged to travel on the rails of a railway track, and axle support members for said flanged rail engaging wheels, adjustable supporting connections for said support members comprising, laterally spaced upwardly projecting posts, the axle support members of each pair of flanged wheels being connected in coaxial relation of the axles thereon, brackets having slideways in fully laterally supporting engagement with said posts mounted on said vehicle frame at the front and rear of the vehicle body member, manually controlled hydraulically actuated means for raising and lowering said axle support members and comprising cylinders and coacting plungers provided with plunger rods operatively connected between said axle support members and said brackets, vertical thrust sustaining members for said axle support member posts mounted on said brackets for adjustment to and from positions overlying the upper ends of said posts, said thrust sustaining members being longitudinally adjustable between their connection to said brackets and their said post engaging portions, means acting to urge said thrust sustaining members to post engaging position, and remotely controlled manually operable means for disengaging said thrust sustaining members from said posts, said posts and said slideways constituting the sole lateral support for said flanged wheels.

8. In a machine of the class described, the combination of a powered manually controllable vehicle including a frame, a body member mounted on said frame, and resiliently tired pairs of power driven wheels gauged to travel on the rails of a railway track, said vehicle frame having portions projecting forwardly and rearwardly relative to said body member and to said driven resiliently tired wheels, front and rear pairs of flanged rail engaging wheels disposed forwardly and rearwardly relative to said tired wheels and gauged to travel on the rails of a railway track, and axle support members for said pairs of flanged rail engaging wheels, adjustable supporting connections for said support members comprising, laterally spaced upwardly projecting posts, brackets having slideways in fully laterally supporting engagement with said posts mounted on said vehicle frame at the front and rear of the vehicle body member, manually controlled hydraulically actuated means for raising and lowering said axle support members and comprising cylinders mounted on said brackets in generally parallel relation to said slideways and coacting plungers provided with plunger rods operatively connected to said axle support members, thrust sustaining members for said axle support member posts pivotally mounted on said brackets in laterally spaced relation to the axes of said posts, said thrust sustaining members having post engaging members pivotally mounted on their lower ends for engagement with the upper ends of said uprights, springs connected to the upwardly projecting ends of said upright engaging members and to said brackets and acting to urge said thrust sustaining members to vertical post engaging and lateral bracket engaging position, and manually operated cables for disengaging said thrust sustaining members from said posts, said posts and said slideways constituting the sole lateral support for said flanged wheels.

9. In a machine of the class described, the combination of a powered manually controllable vehicle including a frame, a body member mounted on said frame, and resiliently tired pairs of power driven wheels gauged to travel on the rails of a railway track, said vehicle frame having portions projecting forwardly and rearwardly relative to said body member and to said driven resiliently tired wheels, front and rear pairs of flanged rail engaging wheels disposed forwardly and rearwardly relative to said tired wheels and gauged to travel on the rails of a railway track, and axle support members for said pairs of flanged rail engaging wheels, adjustable supporting connections for said support members comprising, laterally spaced upwardly projecting uprights, brackets having slideways in surrounding and fully laterally supporting engagement with said uprights mounted on said vehicle frame at the front and rear of the vehicle body member, manually controlled hydraulically actuated means for raising and lowering said axle support members and comprising cylinders mounted on said brackets in generally parallel relation to said slideways and coacting plungers provided with plunger rods operatively connected to said axle support members, thrust sustaining members for said axle support member uprights pivotally mounted on said brackets in laterally outwardly spaced relation to the axes of said uprights with portions thereof projecting upwardly relative to their pivotal connections to said brackets, said thrust sustaining members having post engaging members pivotally mounted on their lower ends for vertical engagement with the upper ends of said uprights and for lateral engagement on their transverse inner sides with said brackets, said thrust sustaining members being longitudinally adjustable between their pivotal connection to said brackets and their said upright engaging members, springs connected to the upwardly projecting ends of said upright engaging members and to said brackets and acting to urge said thrust sustaining members to post engaging position, and manually operated cables for disengaging said thrust sustaining members from said posts, said uprights on said axle support members and said slideways constituting the sole lateral support for said flanged wheels.

References Cited by the Examiner
UNITED STATES PATENTS

| 2,110,230 | 3/1938 | Main _____ | 105—215 |
| 2,482,564 | 9/1949 | Townsend _____ | 105—215 |
| 2,655,873 | 10/1953 | McDonald _____ | 105—215 |
| 2,896,553 | 7/1959 | Whisler _____ | 105—215 |
| 2,968,260 | 1/1961 | Scheldrup _____ | 105—215 |
| 3,003,433 | 10/1961 | Hoppe et al. _____ | 105—215 |

ARTHUR L. LA POINT, *Primary Examiner.*

LEO QUACKENBUSH, *Examiner.*

H. BELTRAN, *Assistant Examiner.*